(12) United States Patent
Crouch et al.

(10) Patent No.: US 9,868,415 B2
(45) Date of Patent: Jan. 16, 2018

(54) VEHICLE SAFETY SYSTEM

(71) Applicants: Lance Crouch, Indian Harbour Beach, FL (US); Tanner Crouch, Indian Harbour Beach, FL (US)

(72) Inventors: Lance Crouch, Indian Harbour Beach, FL (US); Tanner Crouch, Indian Harbour Beach, FL (US)

( * ) Notice: Subject to any disclaimer, the term of this patent is extended or adjusted under 35 U.S.C. 154(b) by 0 days.

(21) Appl. No.: 14/957,077

(22) Filed: Dec. 2, 2015

(65) Prior Publication Data

US 2017/0158164 A1 Jun. 8, 2017

Related U.S. Application Data

(60) Provisional application No. 62/208,251, filed on Aug. 21, 2015.

(51) Int. Cl.
*B60R 22/18* (2006.01)
*B60R 22/34* (2006.01)

(52) U.S. Cl.
CPC .............. *B60R 22/18* (2013.01); *B60R 22/34* (2013.01); *B60R 2022/1806* (2013.01)

(58) Field of Classification Search
CPC .. B60R 22/18; B60R 22/34; B60R 2022/1806
See application file for complete search history.

(56) References Cited

U.S. PATENT DOCUMENTS

| | | | | |
|---|---|---|---|---|
| 4,576,414 A | * | 3/1986 | Molnar | B60R 22/357 24/640 |
| 4,704,771 A | * | 11/1987 | Orje | A44B 11/2511 24/579.11 |
| 5,294,150 A | * | 3/1994 | Steffens, Jr. | B60R 22/1951 280/801.1 |
| 5,630,242 A | * | 5/1997 | Oginaezawa | B26B 27/00 30/294 |
| 5,878,478 A | * | 3/1999 | Hasegawa | A62B 3/005 206/349 |
| 5,987,716 A | * | 11/1999 | Arai | A44B 11/2561 24/631 |
| 6,219,890 B1 | * | 4/2001 | Souther | A44B 11/2561 24/631 |
| 2009/0265858 A1 | * | 10/2009 | White | A62B 3/005 7/158 |

* cited by examiner

*Primary Examiner* — Darlene P Condra
(74) *Attorney, Agent, or Firm* — Bay State IP, LLC

(57) ABSTRACT

A vehicle safety mechanism comprising a seatbelt buckle containing numerous variants of a piercing point or glass breaking mechanism that can be utilized to break open a vehicle window in the event of an emergency. In numerous embodiments, a set of finger grips and a cover for the piercing point are illustrated.

6 Claims, 8 Drawing Sheets

VEHICLE SAFETY SYSTEM

CROSS REFERENCE TO RELATED APPLICATION

This application takes priority from and claims the benefit of U.S. Provisional Patent Application No. 62/208251 filed on Aug. 21, 2015, the contents of which are herein incorporated by reference.

BACKGROUND OF THE INVENTION

1. Field of the System

The instant invention pertains to safety mechanisms and more specifically with safety mechanisms for the automotive, automotive manufacturing, and automobile safety industry.

2. Description of Concurrent Art

Currently, aftermarket hammers and spring-loaded, glass—breaking devices are products designed and geared toward providing a means for escaping a motor vehicle after an accident —particularly upon submergence of the vehicle. Thus, numerous aftermarket products, which are not permanently installed in vehicles, have been relied on for years. However, many of these systems may not be sufficient for escape as these are regularly placed in the glove box during normal operation, and, in the event of a crash, are not easily accessible to the driver.

In many crashes that result in vehicle submergence, the motor vehicle either ends up in the water in an upside down position or ends up turned over on one side at the bottom of the body of water. Additionally, often times, a driver or passenger are injured or trapped upon crashing and thus possess a limited range of motion. As concurrent systems are not designed to be retained on the body of the user, often times these systems are unusable in emergency situations.

SUMMARY OF THE INVENTION

The instant series of system, method and series of apparatuses, as illustrated herein, are clearly not anticipated, rendered obvious, or even present in any of the prior art mechanisms, either alone or in any combination thereof. A versatile system, method and series of apparatuses for accident escape, and the several embodiments of the instant apparatus are illustrated herein.

In its broadest interpretation, this disclosure describes the methods and systems for the vehicle crash assistance seatbelt buckle, a primary goal of which is to provide a system that will readily allow an occupant of a vehicle to escape from the vehicle in emergency situations. It is yet another object of the present system to provide a system that will be positioned on the person of a vehicle occupant in order to readily allow an occupant of a vehicle to escape from the vehicle in emergency situations.

Briefly stated, in one embodiment, the present system contemplates a seatbelt buckle that comprises a fixed buckle comprising a shaped protrusion.

Briefly stated, in one embodiment, the present system contemplates a seatbelt buckle device that comprises a fixed or removably attached buckle comprising a shaped protrusion.

Another embodiment of the present system includes a grip for which the user may hold the seatbelt buckle device.

Another embodiment of the present system includes a cap that keeps the shaped protrusion from harming the user.

An object of the invention is to introduce an inexpensive and easy to operate lifesaving device to automobiles.

Another object of the invention is to provide every passenger in an automobile with a lifesaving device.

Thus, makes the escape tool easily accessible in all situations. Secondly, if a vehicle has more than one passenger, one secondhand tool is not enough. Every second counts while avoiding drowning, so yet another embodiment of the invention puts a tool for escape in the hand of ever passenger. Finally, both of these current devices are aftermarket purchases. Every car should be equipped with an emergency escape device, as over 10% of drowning deaths in the United States are caused by vehicle submergence.

BRIEF DESCRIPTION OF THE DRAWINGS

Advantages of the present system will be apparent from the following detailed description of exemplary embodiments thereof, which description should be considered in conjunction with the accompanying drawings, in which: Having thus described the system in general terms, reference will now be made to the accompanying drawings, which are not necessarily drawn to scale, and wherein.

DETAILED DESCRIPTION OF THE DISCLOSURE

The detailed description set forth below in connection with the appended drawings is intended as a description of presently preferred embodiments of the system and does not represent the only forms in which the present system may be constructed and/or utilized. The description sets forth the functions and the sequence of steps for constructing and operating the system in connection with the illustrated embodiments.

Figure 1A:
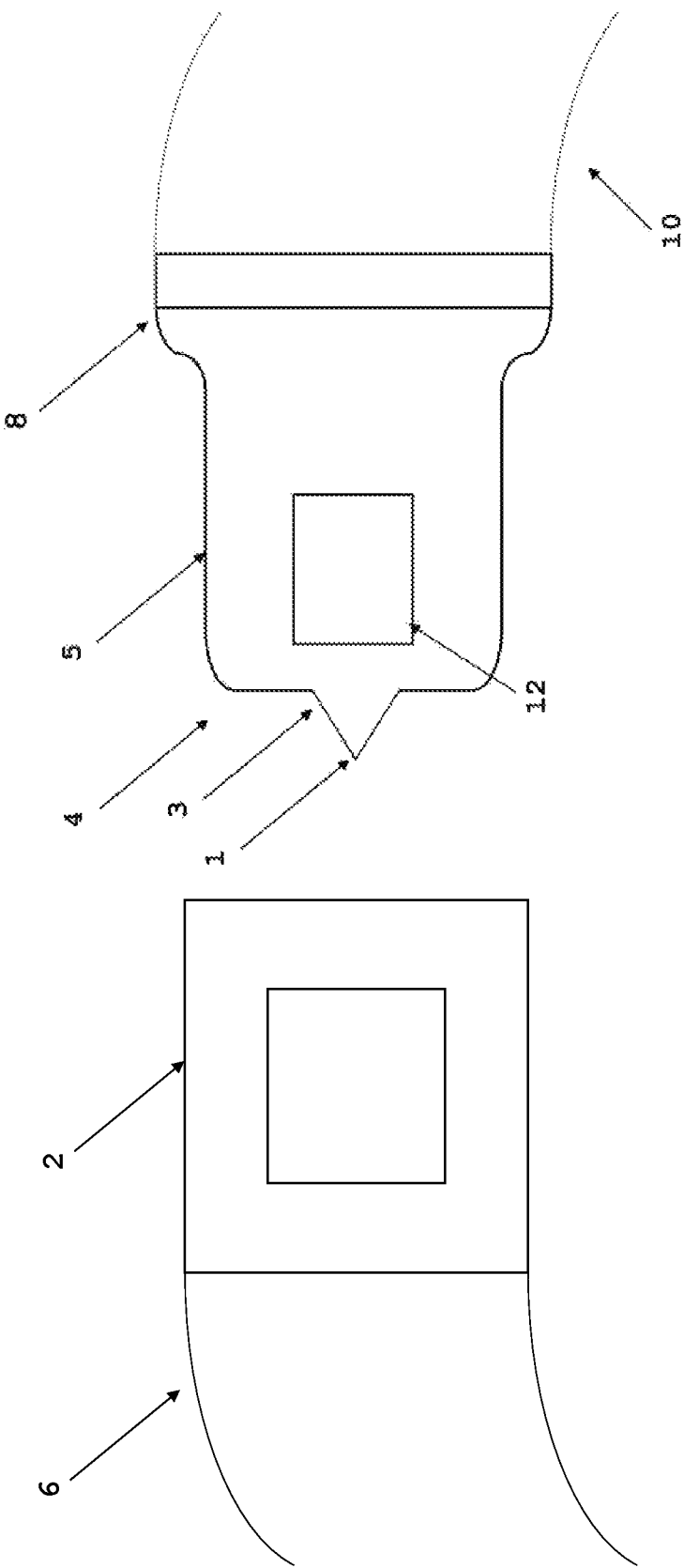
FIG. 1A illustrates a front view of one embodiment of a seatbelt buckle mechanism comprising a seatbelt buckle and a buckle receiver and the piercing protrusion extending from the front of the seatbelt buckle.

Turning now descriptively to the drawings, FIG. 1A illustrates a front view of one embodiment of a seatbelt buckle mechanism comprising a seatbelt buckle 4 and a buckle receiver 2. The buckle receiver 2 is attached to a restraining strap 6 at the rear of the buckle receiver 2. The seatbelt buckle 4 is also attached to a restraining strap 10 at the base 8 of the seatbelt buckle 4. The seatbelt buckle 4 contains a buckle body 5, a buckle attachment mechanism 12, a buckle base 8, and a piercing protrusion 1. In this embodiment the piercing protrusion 1 extends from the front 3 of the seatbelt buckle 4. In this embodiment the piercing point 1 curves from both sides to make a sharp tip.

Figure 1B:
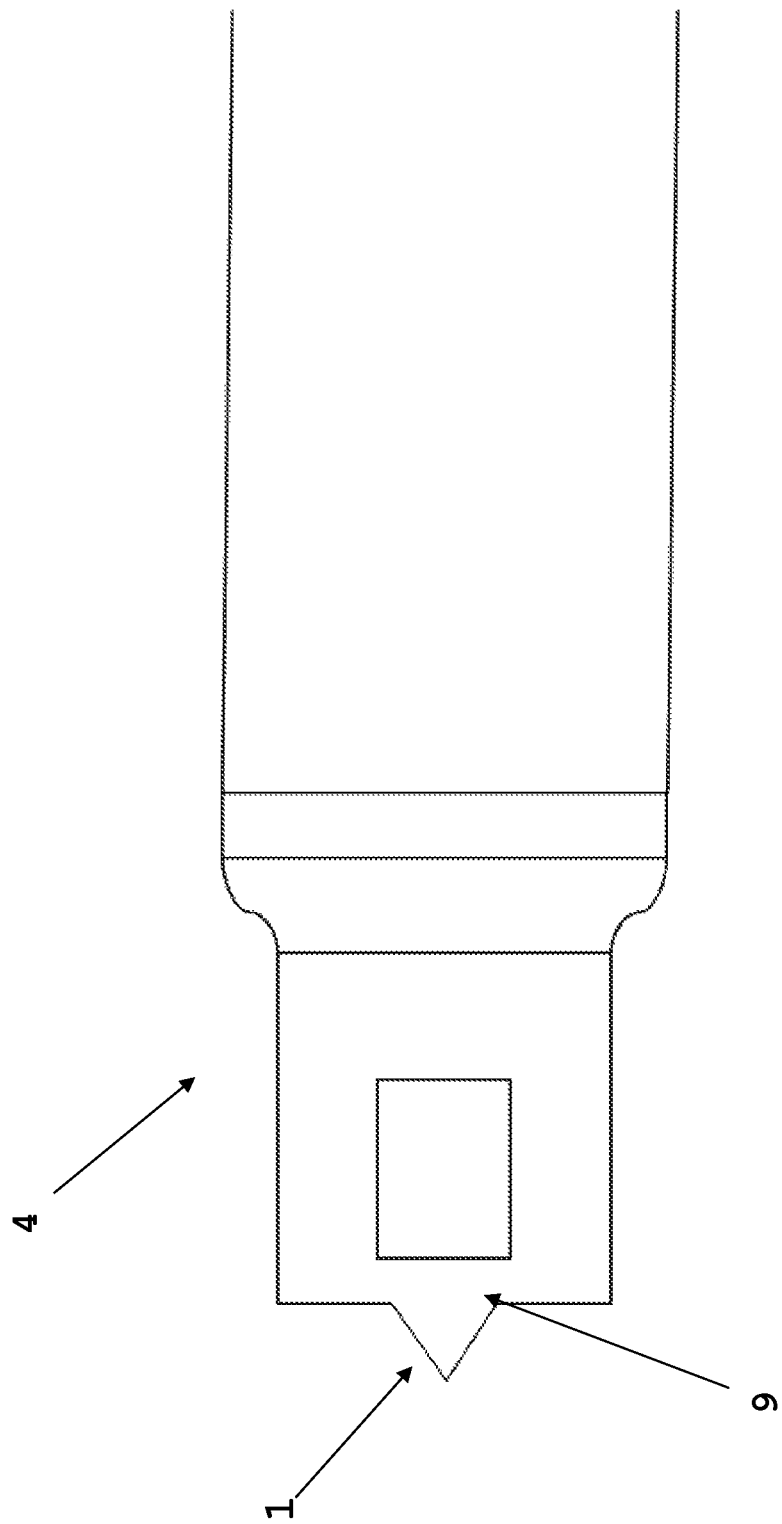
FIG. 1B illustrates an additional embodiment of the invention wherein the piercing point is substantially triangular, with a substantially rigid base.

FIG. 1B illustrates an additional embodiment of the apparatus wherein the piercing point 1 is substantially triangular, with a substantially rigid base 9.

Figure 2:
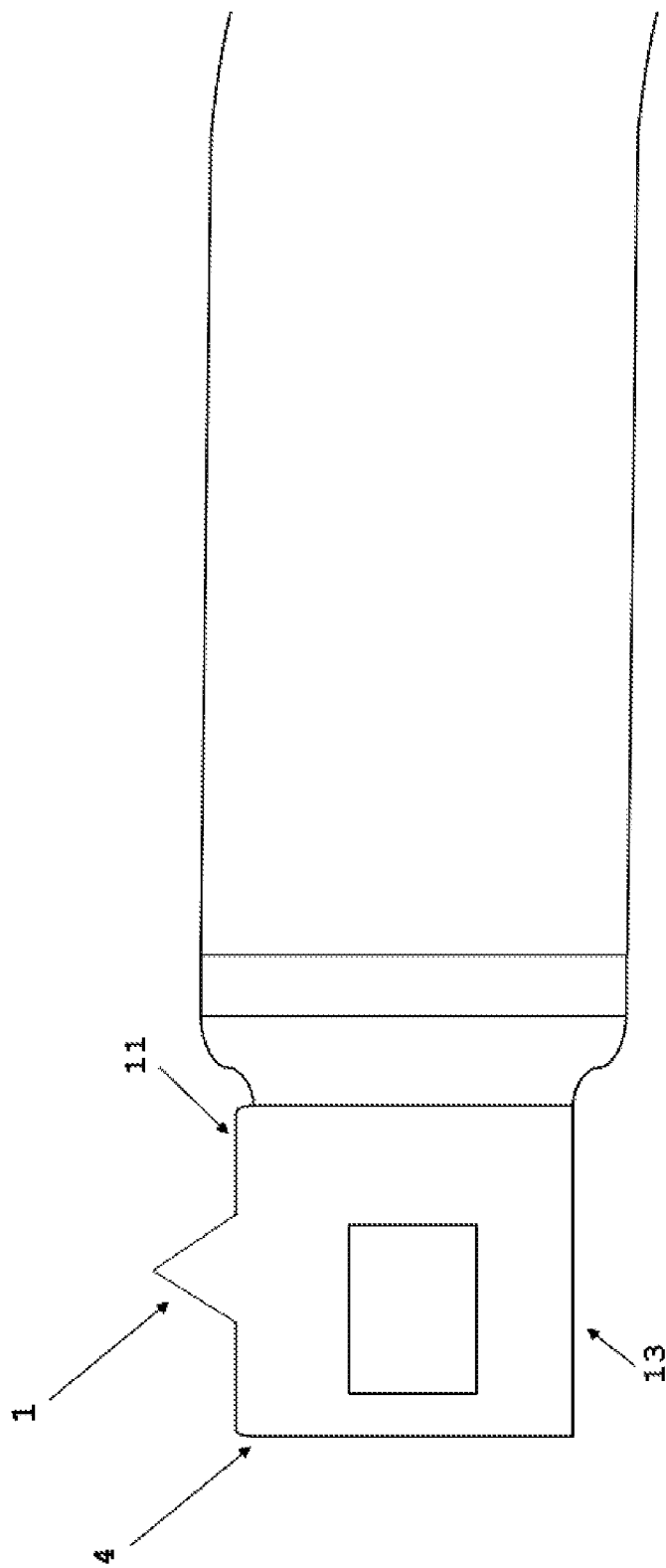
FIG. 2 illustrates an additional embodiment of a seatbelt wherein the piercing point is on the right side of the buckle.

FIG. 2 illustrates an additional embodiment of a seatbelt buckle 4 wherein the piercing point 1 is on the right side 11 of the buckle 4. In this embodiment of the invention the piercing point 1 is on the right side 11 of the seatbelt buckle 4 however in other embodiment the point may be on the left side 13 of the seatbelt buckle 4.

Figure 3:
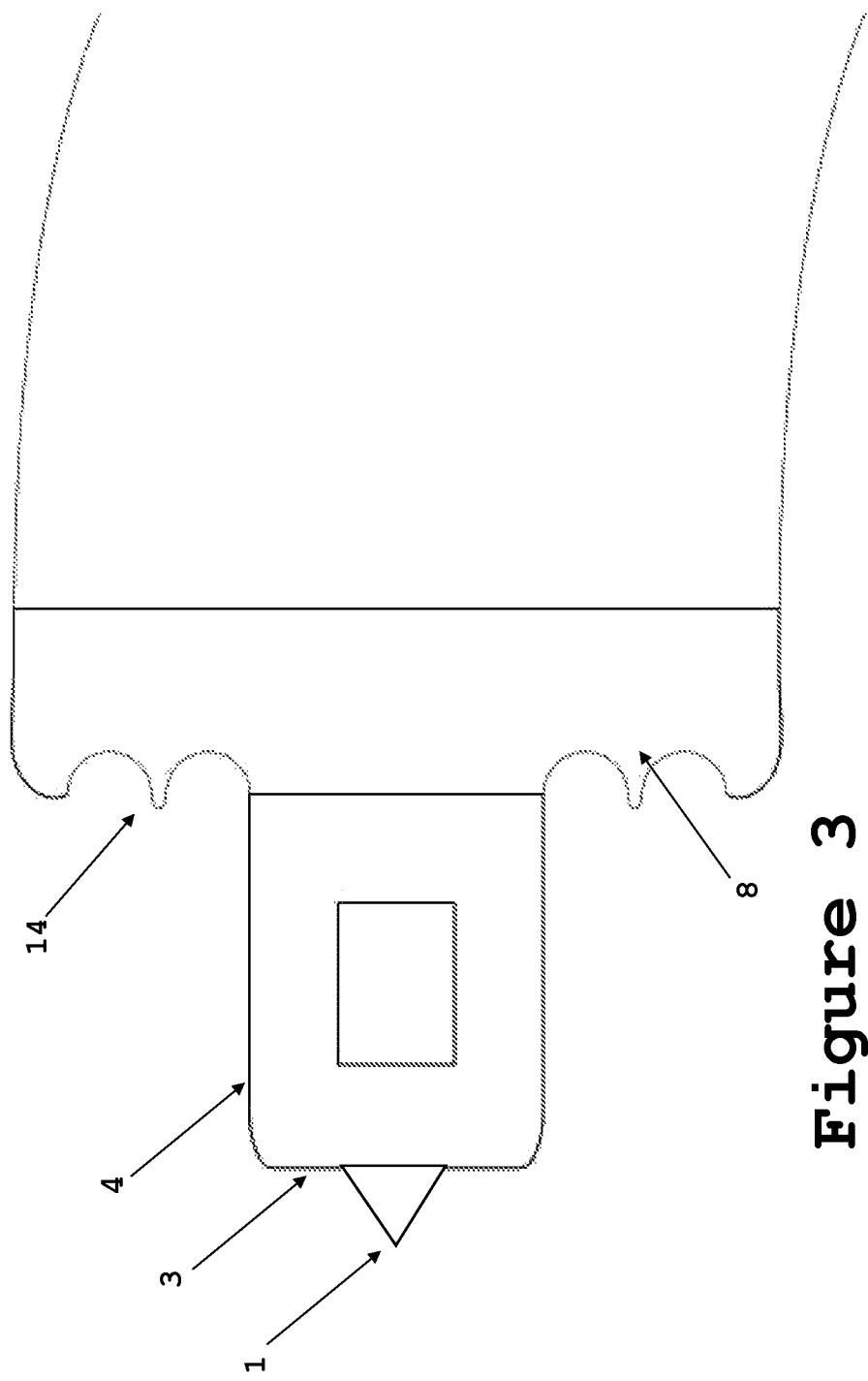
FIG. 3 illustrates an additional embodiment of a seatbelt buckle comprising a set of finger grips on the base and the piercing point located on the front side.

FIG. 3 illustrates an additional embodiment of a seatbelt buckle 4 with finger grips 14 on the base 8. In the embodiment the piercing point 1 is on the front side 3 of the seatbelt buckle 4. The finger grips 14 allow the user to hold the device more firmly and apply more force with the piercing tip 1 when attempting to break a window.

Figure 4:
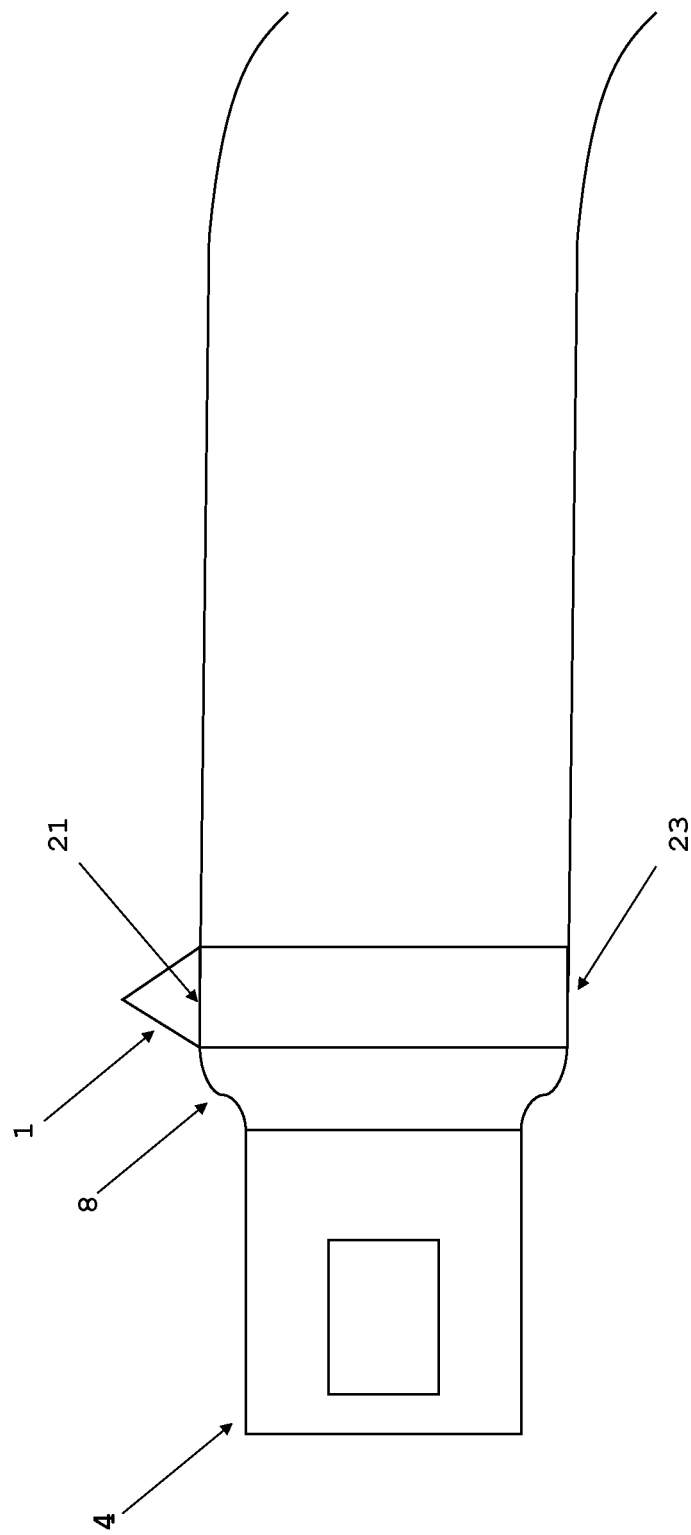
FIG. 4 illustrates an additional embodiment of a seatbelt wherein the piercing point is located on the right side of the base of the seatbelt buckle.

FIG. 4 illustrates an additional embodiment of a seatbelt wherein the piercing point 1 is located on the right side 21 of the base 8 of the seatbelt buckle 4, however in other embodiments the piercing point 1 may be located on the left side 23 of the of the base 8 of the seatbelt buckle 4.

Figure 5:
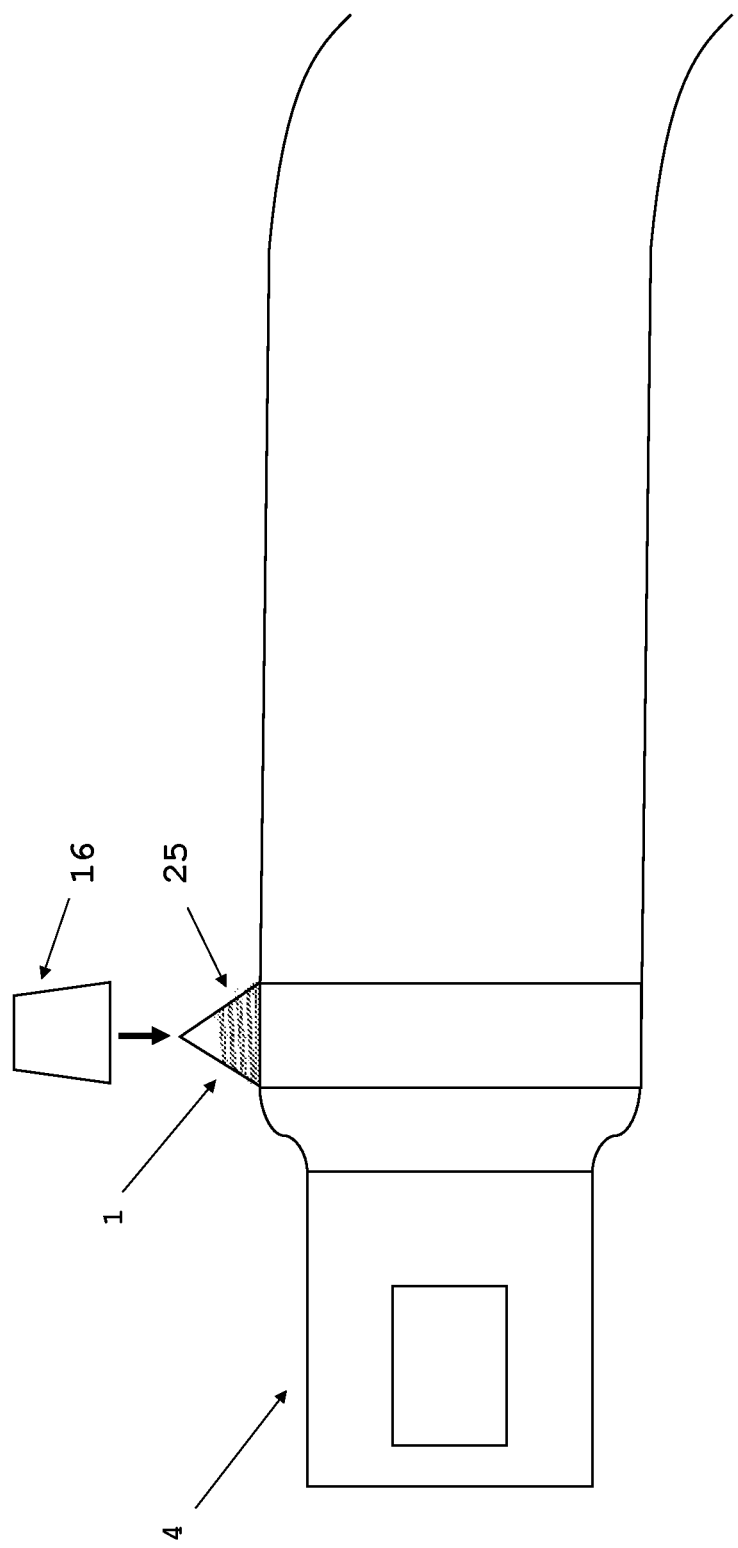
FIG. 5 illustrates an additional embodiment of the seatbelt, wherein a removable cap is used to house the piercing point.

FIG. 5 illustrates an additional embodiment of the seatbelt, wherein a removable cap 16 is used to house the piercing point 1. In this embodiment the base of the piercing point 25 is threaded to secure the cap 16, however in other embodiments other mechanisms may be used to secure the cap 16.

Figure 6:
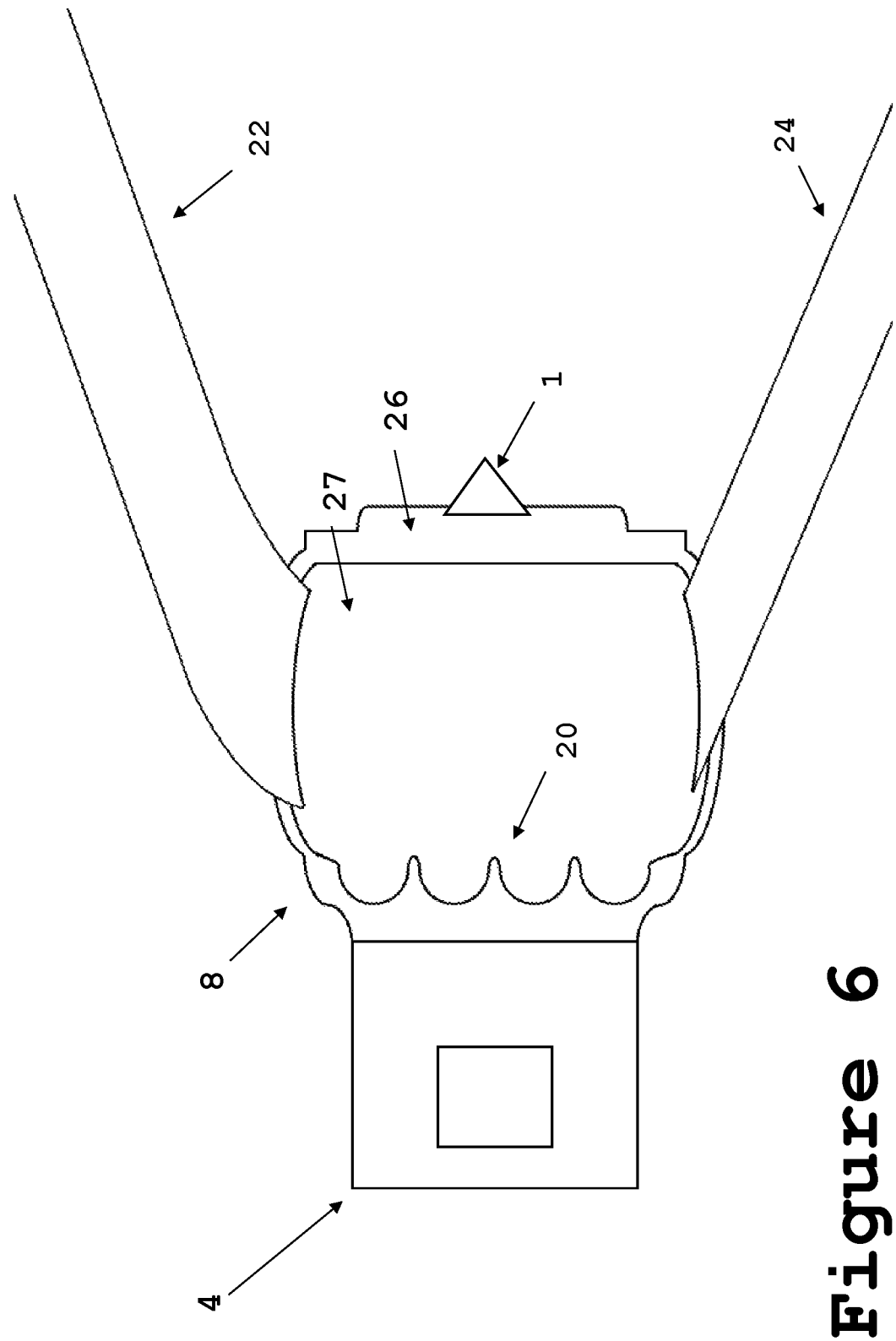
FIG. 6 illustrates an additional embodiment of a seatbelt wherein the base contains a void and a top strap and a bottom strap which are connected to the base, wherein the void contains several finger grips to give the user a better grip on the seatbelt and wherein the piercing point extends from the back of the buckle.

FIG. 6 illustrates an additional embodiment of a seatbelt wherein the base 8 contains a void 27. In this embodiment a top strap 22 and a bottom strap 24 are connected to the base 8. The void 27 contains several finger grips 20 to give the user a better grip on the seatbelt 4. In this embodiment the piercing point 1 extends from the back 26 of the seatbelt buckle 4.

Figure 7:
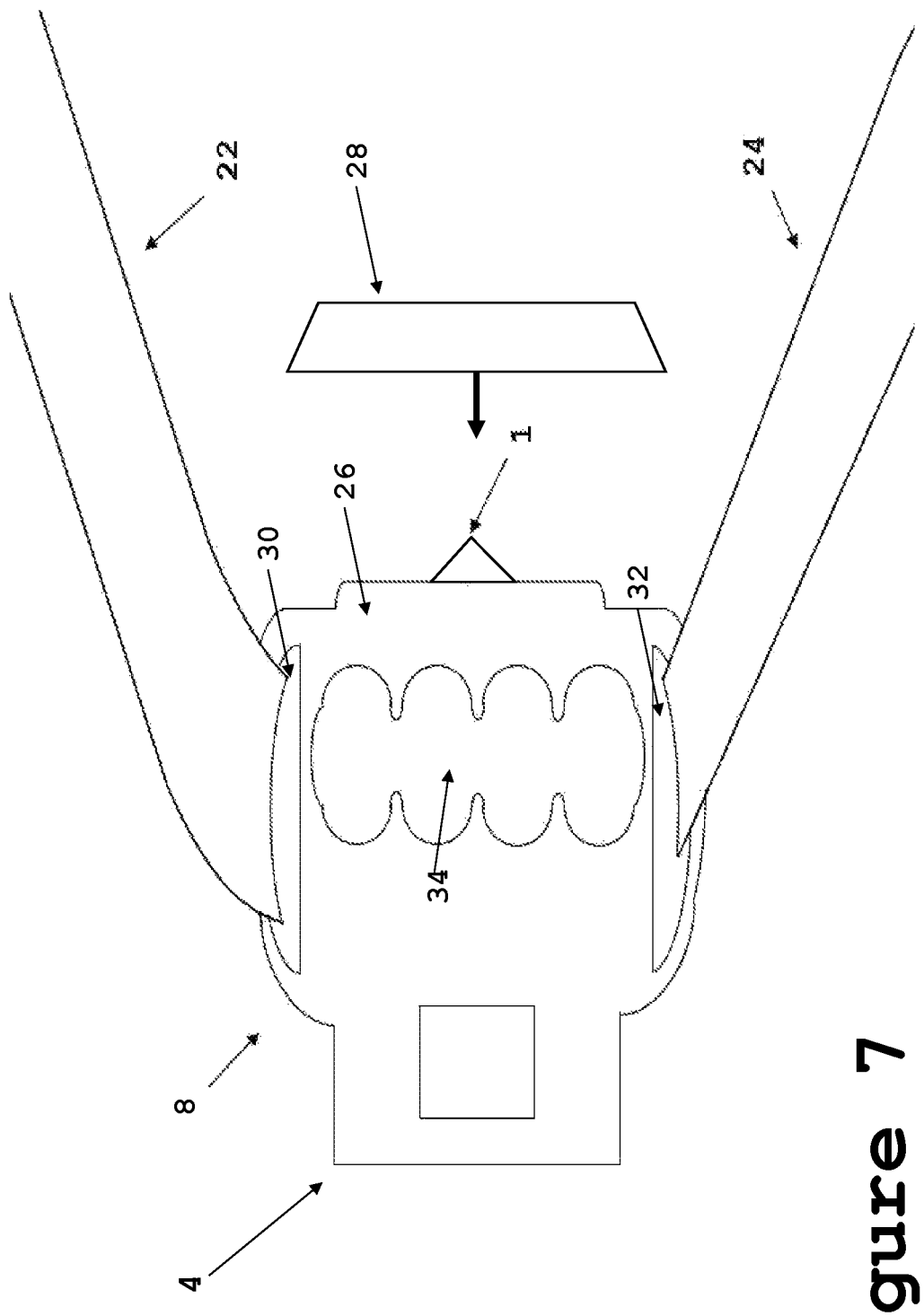
FIG. 7 illustrates an additional embodiment of a seatbelt wherein the base contains a top void and a bottom void and wherein a top strap is connected to the top void and a bottom strap is connected to the bottom void and the base contains several finger grips and the piercing point and a removable cap that houses the piercing point.

FIG. 7 illustrates an additional embodiment of a seatbelt wherein the base 8 contains a top void 30 and a bottom void 32.

In this embodiment a top strap 22 is connected to the top void and a bottom strap 24 is connected to the bottom void 32. The base contains several finger grips 34 to give the user a better grip on the seatbelt 4. In this embodiment the piercing point 1 extends from the back 26 of the seatbelt buckle 4. This embodiment includes a removable cap 28 that houses the piercing point 1.

In an additional embodiment, a motor vehicle occupant restraint mechanism comprises of a seatbelt buckle system comprising a buckle body, a buckling mechanism, a removable piercing point and a buckle base. The motor vehicle occupant restraint mechanism may also comprise a strap mechanism, a strap recoil mechanism and a strap storage mechanism. In one embodiment, the removable piercing point may be located on the buckle body. In one embodiment, the removable piercing point may be located on the strap mechanism.

What is claimed is:

1. A motor vehicle safety system comprising:
    a seatbelt buckle comprising:
        a buckle body further comprising,
            a front side;
            a back side;
            a left side; and
            a right side;
        a buckling mechanism;
        a piercing point; and
        a buckle base comprising:
            a top void; and,
            a bottom void; and,
            a set of individual finger grips;
    a top strap;
    a bottom strap, wherein the top strap is in communication with the top void and the bottom strap is in communication with the bottom void; and wherein the set of finger grips affords the user a grip on the seatbelt.

2. The motor vehicle safety system of claim 1, wherein the piercing point is in communication with the buckle body.

3. The motor vehicle safety system of claim 1, wherein the piercing point is substantially rigid.

4. The motor vehicle safety system of claim 1, wherein the piercing point is in communication with the back side of the buckle body.

5. The motor vehicle safety system of claim 1, wherein the piercing point is in communication with the front side of the buckle body.

6. The motor vehicle safety system of claim 1, wherein the piercing point is housed in a protective cap.

\* \* \* \* \*